US008936772B2

(12) United States Patent
Keiser et al.

(10) Patent No.: US 8,936,772 B2
(45) Date of Patent: Jan. 20, 2015

(54) SILICA CONTAINING PARTICLE

(75) Inventors: Bruce A. Keiser, Plainfield, IL (US);
Nicholas S. Ergang, Glen Ellyn, IL (US); Richard Mimna, Aurora, IL (US)

(73) Assignee: Ecolab USA Inc., Naperville, IL (US)

( * ) Notice: Subject to any disclaimer, the term of this patent is extended or adjusted under 35 U.S.C. 154(b) by 0 days.

(21) Appl. No.: 12/756,548

(22) Filed: Apr. 8, 2010

(65) Prior Publication Data
US 2011/0250341 A1    Oct. 13, 2011

(51) Int. Cl.
*C01B 33/18* (2006.01)
*C01B 33/12* (2006.01)
*B01J 37/03* (2006.01)
*A23L 2/80* (2006.01)
*B01J 21/08* (2006.01)
*B01J 21/12* (2006.01)
*B01J 35/10* (2006.01)
*B82Y 30/00* (2011.01)
*C09D 1/02* (2006.01)

(52) U.S. Cl.
CPC .. *B01J 37/03* (2013.01); *A23L 2/80* (2013.01); *B01J 21/08* (2013.01); *B01J 21/12* (2013.01); *B01J 35/1019* (2013.01); *B01J 35/1042* (2013.01); *B01J 35/1047* (2013.01); *B01J 35/1061* (2013.01); *B82Y 30/00* (2013.01); *C01B 33/12* (2013.01); *C01B 33/18* (2013.01); *C09D 1/02* (2013.01); *C01P 2004/62* (2013.01); *C01P 2004/64* (2013.01); *C01P 2006/12* (2013.01); *C01P 2006/14* (2013.01)
USPC ............................................. 423/338; 423/339

(58) Field of Classification Search
USPC .............................. 423/338, 335; 516/98–112
See application file for complete search history.

(56) References Cited

U.S. PATENT DOCUMENTS

| | | | |
|---|---|---|---|
| 4,272,409 A | 6/1981 | Bergna | |
| 4,474,896 A | 10/1984 | Chao | |
| 4,612,138 A * | 9/1986 | Keiser | 516/88 |
| 4,927,498 A | 5/1990 | Rushmere | |
| 5,164,095 A | 11/1992 | Sparapany et al. | |
| 5,196,177 A | 3/1993 | Watanabe et al. | |
| 5,346,627 A | 9/1994 | Siefert et al. | |
| 5,378,399 A | 1/1995 | Kaliski | |
| 5,503,820 A | 4/1996 | Moffett et al. | |
| 5,980,836 A | 11/1999 | Moffett et al. | |
| 6,060,523 A | 5/2000 | Moffett et al. | |
| 6,077,341 A | 6/2000 | Terase et al. | |
| 6,274,112 B1 | 8/2001 | Moffett et al. | |
| 6,326,326 B1 | 12/2001 | Feng et al. | |
| 6,372,806 B1 * | 4/2002 | Keiser et al. | 516/82 |
| 6,531,224 B1 | 3/2003 | Fryxell et al. | |
| 6,548,149 B1 | 4/2003 | Liu et al. | |
| 6,569,908 B2 | 5/2003 | Noguchi et al. | |
| 6,632,489 B1 | 10/2003 | Watanabe et al. | |
| 6,673,208 B2 | 1/2004 | Persson et al. | |
| 6,723,426 B2 | 4/2004 | Fryxell et al. | |
| 6,749,825 B2 | 6/2004 | Fryxell et al. | |
| 6,752,864 B2 | 6/2004 | Meyer et al. | |
| 6,808,768 B2 | 10/2004 | Satou et al. | |
| 6,916,943 B2 | 7/2005 | Addiego et al. | |
| 7,156,955 B2 | 1/2007 | Nyander et al. | |
| 7,250,148 B2 | 7/2007 | Yang et al. | |
| 7,438,875 B2 | 10/2008 | Do et al. | |
| 7,504,084 B2 | 3/2009 | Simmons et al. | |
| 7,550,060 B2 | 6/2009 | Jacobson et al. | |
| 7,553,547 B2 | 6/2009 | Fryxell et al. | |
| 7,588,798 B2 | 9/2009 | Alford et al. | |
| 7,628,844 B2 * | 12/2009 | Hua | 95/134 |
| 7,629,392 B2 | 12/2009 | Nyander et al. | |
| 7,662,306 B2 | 2/2010 | Persson et al. | |
| 2005/0084438 A1 * | 4/2005 | Do et al. | 423/244.02 |
| 2005/0170109 A1 | 8/2005 | Chen et al. | |
| 2006/0078696 A1 | 4/2006 | Furholz et al. | |
| 2006/0086834 A1 | 4/2006 | Pfeffer et al. | |
| 2007/0026531 A1 | 2/2007 | Mattigod et al. | |
| 2007/0053846 A1 | 3/2007 | Dave et al. | |
| 2007/0231249 A1 * | 10/2007 | Batllo et al. | 423/592.1 |
| 2007/0282122 A1 * | 12/2007 | Holland et al. | 556/466 |
| 2008/0085412 A1 * | 4/2008 | Ortiz | 428/404 |

FOREIGN PATENT DOCUMENTS

| | | |
|---|---|---|
| GB | 1587236 | 4/1981 |
| WO | 98/34723 | 2/1988 |
| WO | 00/56450 | 9/2000 |

OTHER PUBLICATIONS

Iler, Raplh K. "Chemistry of Silica: Solubility, polymerization, colloid, and surface properties, and biochemistry" 1979, Wiley, pp. 5, 154, 155, 462, and 549.*

Hunkeler, et al. Mechanism, Kinetics and Modeling of the Inverse-Microsuspension Homopolymerization of Acrylamide, Polymer, vol. 30(1), pp. 127 to 142 (1989).

Hunkeler, et al. "Mechanism, Kinetics and Modeling of Inverse-Microsuspension Polymerization: 2. Copolymerization of Acrylamide with Quaternary Ammonium Cationic Monomers," Polymer, vol. 32(14), pp. 2626 to 2640 (1991).

(Continued)

Primary Examiner — Anthony J Zimmer
Assistant Examiner — Justin Bova
(74) Attorney, Agent, or Firm — Brinks Gilson & Lione

(57) ABSTRACT

A silica containing composition is disclosed. The silica composition comprising a compound having the following formula $(SiO_2)_x(OH)_yM_zO_aF$: wherein M optionally exists and said M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 0.1-300, and the molar ratio of a/z is dependent on the nature of the metal oxide formed.

11 Claims, No Drawings

(56) References Cited

OTHER PUBLICATIONS

Martellaro et al., "Environmental Application of Mineral Sulfides for Removal of Gas-Phase Hg(0) and Aqueous Hg2+," Separation Science and Technology, vol. 36, pp. 1183-1196, 2001.

Moore et al., "Mercury-Sorption Characteristics of Nanoscale Metal Sulfides," (abstract only), Studies in Surface Science and Catalysis (2000), 129 (Nanoporous Materials II, Proceedings of the Conference on Access in Nanoporous Materials, 2000), pp. 765-772.

Peterson et al., "Nanoscale Metal Sulfides for Mercury Sorption," (abstact only), Abstracts of Papers, 235th ACS National Meeting, New Orleans, LA, Apr. 6-10, 2008.

* cited by examiner

SILICA CONTAINING PARTICLE

FIELD OF THE INVENTION

This disclosure pertains to a silica containing composition.

BACKGROUND OF THE INVENTION

Silica containing materials have ubiquitous applications. More specifically, a variety of manufacturing processes that produce either consumer or industrial products utilize silica-containing materials for various purposes. For example, silica-containing products can be utilized as fillers in coatings (e.g. paints) and polymer composites, catalysts supports, beer/wine/juice clarifiers. New and improved silica containing products with increased performance and ease of use are desired by various industries.

SUMMARY OF THE INVENTION

A. Compositions

The present invention provides for a composition comprising a compound having the following formula $(SiO_2)_x(OH)_yM_zO_aF$: wherein M optionally exists and said M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 0.1-300, and the molar ratio of a/h is dependent on the nature of the metal oxide formed.

In one embodiment, the molar ratio of x/z is at least one of the following: 0.56, 3.5, and 5.5.

B. Product by Process

The present invention also provides for a product produced by filtering an aqueous-based material from a composition comprising a compound having the following formula $(SiO_2)_x(OH)_yM_zO_aF$: wherein M optionally exists and said M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 0.1-300, and the molar ratio of a/z is dependent on the nature of the metal oxide formed and wherein the composition comprises 3% to 15% by weight in an aqueous-based slurry.

The present invention also provides for a product produced from drying an composition at a temperature of 100° C. to 350° C., wherein said a composition comprising a compound having the following formula $(SiO_2)_x(OH)_yM_zO_aF$: wherein M optionally exists and said M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 0.1-300, and the molar ratio of a/z is dependent on the nature of the metal oxide formed.

For both products, in one embodiment, the molar ratio of x/z is at least one of the following: 0.56, 3.5, and 5.5.

C. Methods of Manufacture

The present invention provides for a method of forming a silica-based product/composition comprising: a. providing a silica containing precursor (SCP) contained in solution that has a pH less than or equal to a pH of 7; b. optionally doping the SCP with one or more metal species, wherein said doping occurs when the solution has a pH less than or equal to a pH of 7; c. adjusting the pH of the solution to greater than 7; d. adding an effective amount of salt to the solution so that the conductivity of the solution is greater than or equal to 4 mS, wherein said addition occurs prior to, simultaneous with, or after the pH adjustment in step 1c; e. optionally filtering and drying the SCP; and f. optionally reacting the dried product from step e with a functional group and optionally wherein the resultant functionalized dried product is at least one of the following: a functionalized metal oxide-doped or metal sulfide-doped silica product.

The present invention also provides for a method of forming a silica-based product/composition comprising: a. providing a silica containing precursor (SCP) contained in solution that has a pH greater than 7; b. adjusting the pH of the solution to less than or equal to 7; c. optionally doping the SCP with one or more metal species, wherein said doping occurs when the solution has a pH less than or equal to a pH of 7; d. adjusting the pH of the solution to greater than 7; e. adding an effective amount of salt to the solution so that the conductivity of the solution is greater than or equal to 4 mS, wherein said addition occurs prior to, simultaneous with, or after the pH adjustment in step 2d; f. optionally filtering and drying the SCP; and g. optionally reacting the dried product from step f with a functional group and optionally wherein the resultant functionalized dried product is at least one of the following: a functionalized metal oxide-doped or metal sulfide-doped silica product.

DETAILED DESCRIPTION OF THE INVENTION

Any patents and published applications mentioned in this application are herein incorporated by reference.

As specified above, the present invention provides a composition that contains a compound with a sulfur component, specifically a compound having the following formula $(SiO_2)_x(OH)_yM_zO_aF$: wherein M optionally exists and said M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 0.1-300, and the molar ratio of a/z is dependent on the nature of the metal oxide formed.

The compound can be in various forms and proportions relative to the components of the compositions. In addition, various products can contain the compounds encompassed by this invention. For example, the following compound embodiments can stand alone, be further modified by chemical and/or physical means, or integrated into other products, e.g. consumer or industrial products.

In one embodiment, the compound comprises 3% to 15% by weight in an aqueous-based slurry.

In another embodiment, the compound comprises 15% to 40% by weight in a wet cake form.

In another embodiment, the compound comprises 40% to 99% by weight in a powder form.

In another embodiment, the compound has a particle size of 5 to 200 μm containing aggregated nanoparticles ranging from 3 to 500 nm. In another embodiment, the compound has a surface area of 30 m2/g to 800 m2/g.

In another embodiment, the compound has a pore volume of 0.3 cc/g to 2.0 cc/g.

In another embodiment, the present invention also provides for a product produced by filtering an aqueous-based material from a composition comprising a compound having the following formula $(SiO_2)_x(OH)_yM_zO_aF$: wherein M optionally exists and said M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 0.1-300, and the molar ratio of a/z is dependent on the nature of the metal oxide formed and wherein the composition comprises 3% to 15% by weight in an aqueous-based slurry.

In another embodiment, the product is produced from drying a composition at a temperature of 100° C. to 350° C., wherein said a composition comprising a compound having the following formula $(SiO_2)_x(OH)_yM_zO_aF$: wherein optionally exists and said M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein F optionally exists and said F is at least one of the following: a functionalized organosilane, a sulfur-containing organosilane, an amine-containing organosilane, and an alkyl-containing organosilane at a surface area coverage of 0.01-100%; and wherein the molar ratio of y/x is equal to 0.01-0.5, the molar ratio of x/z is equal to 0.1-300, and the molar ratio of a/z is dependent on the nature of the metal oxide formed.

The compounds can be made in various ways, such as those disclosed in US Patent Publication No. 20070231249, which is herein incorporated by reference.

As stated above, the silica containing products encompassed by this invention can be made by the following methods.

One methodology involves starting from an acidic starting point.

In one embodiment, the method comprises forming a silica-based product comprising the steps of: a. providing a silica containing precursor (SCP) contained in solution that has a pH less than or equal to a pH of 7; b. optionally doping the SCP with one or more metal species, wherein said doping occurs when the solution has a pH less than or equal to a pH of 7; c. adjusting the pH of the solution to greater than 7; d. adding an effective amount of salt to the solution so that the conductivity of the solution is greater than or equal to 4 mS, wherein said addition occurs prior to, simultaneous with, or after the pH adjustment in step 1c; e. optionally filtering and drying the SCP; and f. optionally reacting the dried product from step e with a functional group and optionally wherein the resultant functionalized dried product is at least one of the following: a functionalized metal oxide-doped or metal sulfide-doped silica product.

In another embodiment, the functional group in step f is an organosilane.

In another embodiment, the silicon-containing precursor is selected from at least one of the following: silicic acid, colloidal silica, tetraethylorthosilicate, and dispersed fumed silica.

In another embodiment, the pH range of the SCP in step 1(a) is from 3 to 4.

In another embodiment, the pH of the SCP is adjusted to greater than 7 by mixing/interacting the molecules of said SCP with an alkaline solution at a shear rate of 6 to 23 m/s based on tip speed. In another embodiment, the method further comprises adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then be attached or in communication with a receptacle that holds/processes a mixed product resulting from said pH adjustment of said SCP.

Additionally, Ultra Turax, Model Number UTI-25 (available from IKA® Works, Inc. in Wilmington, N.C.), a mixing device, can be utilized.

It is envisioned that any suitable reactor or mixing device/chamber may be utilized in the method of the invention.

In another embodiment, the method further comprises adjusting the pH of the SCP to greater than 7 by combining said SCP with an alkaline solution with mixing yielding a Reynolds Number greater than or equal to 2000, to form the silica based product.

In another embodiment, the method further comprises adjusting the pH of the SCP to greater than 7 by combining said SCP with an alkaline solution under transitional flow conditions, i.e. Reynolds Numbers between 2000 and 4000, to form the silica based product.

In another embodiment, the method further comprises adjusting the pH of the SCP to greater than 7 by combining said SCP with an alkaline solution under turbulent flow conditions, i.e. Reynolds Numbers greater than or equal to 4000, to form the silica based product.

In another embodiment, the pH of the SCP is adjusted to a pH range of 7 to 11 with the use of a chemistry selected from at least one of the following: ammonium hydroxide, ammonium carbonate, mineral bases such as but not limited to sodium hydroxide and/or potassium hydroxide, organic bases such as but not limited to trimethylammonium hydroxide, alkaline silicates, sulfide salts such as but not limited to sodium sulfide, and polysulfide containing salts such as but not limited to calcium polysulfide and/or sodium polysulfide.

In another embodiment, the resulting slurry from step d is filtered and dried such that the solid concentration of said dried and filtered product is increased from about 5 wt % to about 99 wt %.

In another embodiment, the dried product from step e is surface treated with an organosilane via controlled hydrolysis and condensation of the silane to the silica surface in at least one of the processes: an organic solvent, supercritical solvent, or solvent-free process.

Another methodology involves starting from an alkaline starting point.

In one embodiment, the method comprises forming a silica-based product comprising the steps of a. providing a silica containing precursor (SCP) contained in solution that has a pH greater than 7; b. adjusting the pH of the solution to less than or equal to 7; c. optionally doping the SCP with one or more metal species, wherein said doping occurs when the solution has a pH less than or equal to a pH of 7; d. adjusting the pH of the solution to greater than 7; e. adding an effective amount of salt to the solution so that the conductivity of the solution is greater than or equal to 4 mS, wherein said addition occurs prior to, simultaneously with, or after the pH adjustment in step 2d; f. optionally filtering and drying the SCP; and g. optionally reacting the dried product from step f with a functional group and optionally wherein the resultant functionalized dried product is at least one of the following: functionalized metal oxide-doped or metal sulfide-doped silica product.

In another embodiment, the functional group in step g is an organosilane.

In another embodiment, the silicon-containing precursor is selected from at least one of the following: silicic acid, colloidal silica, alkaline silicates, tetraethylorthosilicate, and dispersed fumed silica.

In another embodiment, the pH of the silicon-containing precursor is adjusted through the use of at least one of the following: carbonic acid, an organic acid(s) such as but not limited to acetic acid, a mineral acid(s) such as but not limited to sulfuric acid and/or hydrochloric acid such that the pH is decreased to a range of from to 2 to 7.

In another embodiment, the pH range of the SCP is adjusted to a range of 3 to 4 with acetic acid.

In another embodiment, the pH of the SCP is adjusted to a pH range of 7 to 11 with the use of a chemistry selected from at least one of the following: ammonium hydroxide, ammonium carbonate, mineral bases, organic bases, alkaline silicates, sulfide salts, and polysulfide containing salts.

In another embodiment, the resulting slurry from step e is filtered and dried such that the solid concentration of said dried and filtered product is increased from about 5 wt % to about 99 wt %.

In another embodiment, the dried product from step f is surface treated with an organosilane via controlled hydrolysis and condensation of the silane to the silica surface in at least one of the following: an organic solvent, supercritical solvent, or solvent-free process.

In another embodiment, the pH of the SCP is adjusted to greater than 7 by mixing said SCP with an alkaline solution at a shear rate of 6 to 23 m/s based on tip speed.

In another embodiment, the method further comprises adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then be attached or in communication with a receptacle that holds/processes a mixed product resulting from said pH adjustment of said SCP.

Additionally, Ultra Turax, Model Number UTI-25 (available from IKA® Works, Inc. in Wilmington, N.C.), a mixing device, can be utilized.

It is envisioned that any suitable reactor or mixing device/chamber may be utilized in the method of the invention.

In another embodiment, the method further comprises adjusting the pH of the SCP to greater than 7 by combining said SCP with an alkaline solution with mixing yielding a Reynolds Number greater than or equal to 2000, to form the silica based product.

In another embodiment, the method further comprises adjusting the pH of the SCP to greater than 7 by combining said SCP with an alkaline solution under transitional flow conditions, i.e. Reynolds Numbers between 2000 and 4000, to form the silica based product. In another embodiment, the method further comprises adjusting the pH of the SCP to greater than 7 by combining said SCP with an alkaline solution under turbulent flow conditions, i.e. Reynolds Numbers greater than or equal to 4000, to form the silica based product. In another embodiment, the organosilanes are of various types and may be represented generally by $R_{(4-a)}$—$SiX_a$, wherein a may be from 1 to 3. The organo-functional group, R—, may be any aliphatic or alkene containing functionalized group such as propyl, butyl, 3-chloropropyl and combinations thereof. X is representative of a hydrolysable alkoxy group, typically methoxy or ethoxy. Some examples are 3-thiopropyl and mercaptopropyl silanes.

During the preparation of the composition of this invention, salt is added to increase the conductivity of the reaction solution to 4 mS. Examples of the salts that can be used include, but are not limited to at least one of the following: alkali and alkaline halides, sulfates, phosphates, and nitrates such as sodium sulfite, potassium chloride, sodium chloride, sodium nitrate, calcium sulfate, and potassium phosphate. One skilled in the are would recognize that the effective amount of salt added to reach the desired conductivity will vary dependent on the salt of choice.

EXAMPLES

Example 1

In this example, 2180 g of 7 wt % silicic acid was added to a heel containing 450 g of deionized (DI) water and 150 g of silicic acid heated to 90° C. The silicic acid was fed at 10 ml/min for 3 h via a peristaltic pump into a 5 L reaction flask.

A solution containing 16.4 g of 25 wt % ammonia solution and 5.84 g of ammonium carbonate was prepared in 24.6 g of DI water. The solution was added to the reaction flask quickly whereupon the viscosity of the solution increased significantly. The mixture was stirred for 30 minutes, then any remaining silicic acid was fed at 20 ml/min. Upon completion of the silicic acid feed, the heating was turned off and the solution was allowed to cool.

The silica slurry was filtered and freeze-dried at 300° C. to produce a dry powder. Nitrogen sorption analysis of the powder was performed on an Autosorb-1C unit from Quantachrome. The sample was degassed at 300° C. for 2 h, then characterized by a multi-point BET (Brunauer, Emmett, and Teller—a surface area test) surface area, total pore volume, and BJH (Barrett-Joyner-Halenda) adsorption pore size distribution. Physical data indicated a surface area of 354 square meters per gram, a pore volume of 1.19 cc/g, and a pore diameter of 13.5 nm.

Example 2

In this example, three solutions were prepared: A) 100 g of Nalco N8691 silica sol, B) 3 g of glacial acetic acid dissolved in 50 g of DI water, and C) 2.7 g of ammonium carbonate and 7.5 g of 25 wt % ammonia dissolved in 150 g of DI water. Solution B was added to solution A, followed by subsequent addition of solution C at a high shear rate. The mixture was stirred for 1-2 minutes before filtration. Nalco N8691 can be obtained from Nalco Company, 1601 West Diehl Road, Naperville, Ill. 60563.

The silica slurry was filtered and dried at 300° C. to produce a dry powder. Nitrogen sorption analysis was performed on an Autosorb-1C unit from Quantachrome. The sample was degassed at 300° C. for 2 h, then characterized by a multi-point BET surface area, total pore volume, and BJH adsorption pore size distribution. Nitrogen sorption analysis indicated a surface area of 240 square meters per gram, a pore volume of 0.57 cc/g, and a pore diameter of 9.6 nm.

Example 3

In this example, three solutions were prepared: A) 100 g Nalco N8691 silica sol, B) 3 g glacial acetic acid and 11.8 g polyaluminum chloride dissolved in 50 g DI water, and C) 15 g of 25 wt % ammonia dissolved in 150 g DI water. Solution B was added to solution A with mixing, followed by subsequent addition of solution C at a high shear rate. The mixture was stirred for 1-2 minutes before filtration.

The Al-doped silica slurry was filtered and dried at 300° C. to produce a dry powder, followed by nitrogen sorption analysis performed on an Autosorb-1C unit from Quantachrome. The sample was degassed at 300° C. for 2 h, then characterized by a multi-point BET surface area, total pore volume, and BJH adsorption pore size distribution. Nitrogen sorption analysis indicated a surface area of 469 square meters per gram, a pore volume of 0.82 cc/g, and a pore diameter of 7.0 nm.

COMBINATIONS OF COMPONENTS DESCRIBED IN PATENT APPLICATION

In one embodiment, the composition of matter claims include various combinations of sorbent components and associated compositions, such molar ratios of constituent particles. In a further embodiment, the claimed compositions include combinations of the dependent claims. In a further embodiment, a range or equivalent thereof of a particular component shall include the individual component(s) within the range or ranges within the range.

In another embodiment, the method of use claims include various combinations of the sorbent components and associated compositions, such molar ratios of constituent particles. In a further embodiment, the claimed methods of use include combinations of the dependent claims. In a further embodiment, a range or equivalent thereof of a particular component shall include the individual component(s) within the range or ranges within the range.

In another embodiment, the method of manufacture claims include various combinations of the sorbent components and associated compositions, such pH control. In a further embodiment, the claimed methods of use include combinations of the dependent claims. In a further embodiment, a range or equivalent thereof of a particular component shall include the individual component(s) within the range or ranges within the range.

What is claimed is:

1. A composition comprising a compound having the following formula $(SiO_2)_x(OH)_yM_zO_a$: wherein M is at least one of the following: boron, magnesium, aluminum, calcium, titanium, vanadium, manganese, iron, cobalt, nickel, copper, zinc, zirconium, molybdenum, palladium, silver, cadmium, tin, platinum, gold, and bismuth; and wherein the molar ratio of y/x is equal to 0.01-0.5, the molar ratio of x/z is equal to 0.1-300, wherein the compound has a pore volume of greater than 0.8 cc/g but less than or equal to about 2.0 cc/g, and wherein the composition has a particle size of 5 to 200 μm containing aggregated nanoparticles having particle sizes ranging from 3 to 500 nm.

2. The composition of claim 1, wherein the compound comprises 3% to 15% by weight in an aqueous-based slurry.

3. The composition of claim 1, wherein the compound comprises 15% to 40% by weight in a wet cake form.

4. The composition of claim 1, wherein the compound comprises 40% to 99% by weight in a powder form.

5. The composition of claim 4, wherein the compound has a surface area of 30 $m^2/g$ to 800 $m^2/g$.

6. A product produced from drying a composition at a temperature of 100° C. to 350° C., wherein said composition is a composition comprising a compound having the following formula $(SiO_2)_x(OH)_yM_zO_a$: wherein M is at least one of the following: boron, magnesium, aluminum, calcium, titanium, vanadium, manganese, iron, cobalt, nickel, copper, zinc, zirconium, molybdenum, palladium, silver, cadmium, tin, platinum, gold, and bismuth; and wherein the molar ratio of y/x is equal to 0.01-0.5, the molar ratio of x/z is equal to 0.1-300, wherein the compound has a pore volume of greater than 0.8 cc/g but less than or equal to about 2.0 cc/g, and wherein the composition has a particle size of 5 to 200 μm containing aggregated nanoparticles having particle sizes ranging from 3 to 500 nm.

7. The composition of claim 1, wherein the molar ratio is selected from the group consisting of 0.56, 3.5, and 5.5.

8. A composition comprising a compound having the following formula $(SiO_2)_x(OH)_yM_zO_a$: wherein M is at least one of the following: boron, magnesium, aluminum, calcium, titanium, vanadium, manganese, iron, cobalt, nickel, copper, zinc, zirconium, molybdenum, palladium, silver, cadmium, tin, platinum, gold, and bismuth; and wherein the molar ratio of y/x is equal to 0.01-0.5, the molar ratio of x/z is equal to 0.1-300, wherein the compound has a pore volume of greater than 0.8 cc/g but less than or equal to about 2.0 cc/g, and wherein the composition has a particle size of 5 to 200 μm containing aggregated nanoparticles having particle sizes of about 500 nm.

9. The composition of claim 8, wherein the compound comprises 3% to 15% by weight in an aqueous-based slurry.

10. The composition of claim 8, wherein the compound comprises 15% to 40% by weight in a wet cake form.

11. The composition of claim 8, wherein the compound comprises 40% to 99% by weight in a powder form.

* * * * *